United States Patent
Hall et al.

(10) Patent No.: US 8,225,273 B2
(45) Date of Patent: Jul. 17, 2012

(54) UTILIZATION OF WEIGHTS AND VISUALIZATION OF CONCEPTUAL FRAMEWORKS IN UNIFIED MODELING

(75) Inventors: Anthony D. Hall, Cary, NC (US); Sonal M. Starr, Cary, NC (US); Virginia M. Wallace, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/769,154

(22) Filed: Jun. 27, 2007

(65) Prior Publication Data

US 2009/0007060 A1   Jan. 1, 2009

(51) Int. Cl.
*G06F 9/44* (2006.01)
(52) U.S. Cl. ........ 717/104; 717/101; 717/102; 717/103; 717/105; 717/115
(58) Field of Classification Search ............ 717/104
See application file for complete search history.

(56) References Cited

U.S. PATENT DOCUMENTS

| 6,343,265 | B1 | 1/2002 | Glebov et al. |
| 6,804,686 | B1 | 10/2004 | Stone et al. |
| 2002/0038206 | A1* | 3/2002 | Dori ........................... 703/22 |
| 2004/0107414 | A1* | 6/2004 | Bronicki et al. ........... 717/105 |
| 2004/0236766 | A1 | 11/2004 | Simonin |
| 2007/0074182 | A1* | 3/2007 | Hinchey et al. ........... 717/136 |

OTHER PUBLICATIONS

Nassar, Mahmoud. "VUML: a Viewpoint oriented UML Extension." Proceedings of the 18th IEEE International Conference on Automated Software Engineering (ASE '03), 2003.

* cited by examiner

*Primary Examiner* — Thomas K Pham
(74) *Attorney, Agent, or Firm* — Hoffman Warnick LLC; Andrea Bauer

(57) ABSTRACT

A system, method and program product for displaying unified model (UM) data in a UM visualization. A system is provided that includes: a weighting system for assigning weights to UM elements; a clustering system for clustering UM elements into categories; and a visualization system for displaying clustered and weighted UM elements within a conceptual framework.

16 Claims, 4 Drawing Sheets

UTILIZATION OF WEIGHTS AND VISUALIZATION OF CONCEPTUAL FRAMEWORKS IN UNIFIED MODELING

FIELD OF THE INVENTION

This disclosure relates generally to unified modeling, and more particularly relates to the utilization of weights and visualization of conceptual frameworks in unified modeling.

BACKGROUND OF THE INVENTION

Unified or object modeling is commonly used to model software, business processes, systems engineering, etc., as well as represent arrangements such as organizational structures. In the business process context it is not uncommon to utilize unified modeling systems such as unified modeling language (UML), IBM's Rational Unified Process® (RUP), and IBM's Rational Software Modeler® (RSM) to characterize complex business operations. Typical characterizations include model diagrams that contain boxes (i.e., model elements) that are nested and/or linked by connectors or arrows to show process flows.

For example, consider a large multinational corporate web presence that serves millions of pages of web content to millions of viewers, which in turn drives significant revenue opportunities for the company. Such an application may involve hundreds of web developers working in different divisions, in different languages, with different business procedures and goals. Given the complex nature of the business processes, significant challenges exist in creating efficiencies to enhance the overall web presence and user experiences. Unified modeling systems however could be utilized to characterize external web users' roles, goals, use cases, activities, objects, etc. With such a characterization, the external web experience could be enhanced, which would in turn create more revenue opportunities.

However, when modeling complex processes, current modeling systems are subject to various drawbacks. One such drawback involves the relative importance of the model elements. Current unified modeling systems treat each goal identified in a model as having the same importance; i.e., each goal is equivalent in importance to every other goal in the model. The same can be said for how roles, cases, activities, and objects are treated in the model. There is no way to apply weights to goals or other elements in the model.

A second drawback involves the categorization or family relationships among model elements. Current unified modeling systems treat each goal identified in a model as having the same category or family; each goal is of the same kind as any other goal in the model. The same can be said for how roles, cases, activities, and objects are treated in the model. The way in which categories of elements are depicted is by creating a separate branching system in the UML diagram. There is no way to depict categories of goals that would make it easy to see the goal categories and relationships among the elements in a category or family.

A third drawback involves the lack of visualization of model conceptual frameworks and worlds. Current unified modeling systems provide incredible detail in relationships among elements in a model, but the output from these processes, languages, and tools are highly technical and thus not readily consumable by a larger audience who may find a model of value. Potential consumers of such models may include not only modelers, architects, and programmers, but include also key stakeholders, such as executive decision-makers, industry analysts, and external customers. There is no obvious rendering capability to create easy-to-read visualizations of the model elements in meaningful configurations. A visualization of this kind should be able to be examined by executives, analysts, or customers quickly for all information relevant to them for a high-level understanding of the model.

Accordingly, a need exists for a unified modeling system that includes more robust display features to enhance the modeling experience for different types of users.

SUMMARY OF THE INVENTION

The present invention relates to a system, method and program product for displaying unified model (UM) data in an enhanced manner. In one embodiment, there is a system for displaying unified model (UM) data in a UM visualization, comprising: a weighting system for assigning weights to UM elements; a clustering system for clustering UM elements into categories; and a visualization system for displaying clustered and weighted UM elements within a conceptual framework.

In a second embodiment, there is a program product stored on a computer readable medium, which when executed by a computer system, displays unified model (UM) data in a UM visualization, and comprises: program code configured for assigning weights to UM elements; program code configured for clustering UM elements into categories; and program code configured for outputting the UM visualization, wherein the UM elements are clustered and weighted within a conceptual framework.

In a third embodiment, there is a method for displaying unified model (UM) data in a UM visualization, comprising: assigning weights to UM elements; clustering UM elements into categories; displaying clustered and weighted UM elements within a conceptual framework; and outputting the UM visualization containing the conceptual framework.

In a fourth embodiment, there is a method for deploying a method for deploying a system for displaying unified model (UM) data in a UM visualization, comprising: providing a computer infrastructure being operable to: assign weights to UM elements; cluster UM elements into categories; display clustered and weighted UM elements within a conceptual framework; and output the UM visualization containing the conceptual framework.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
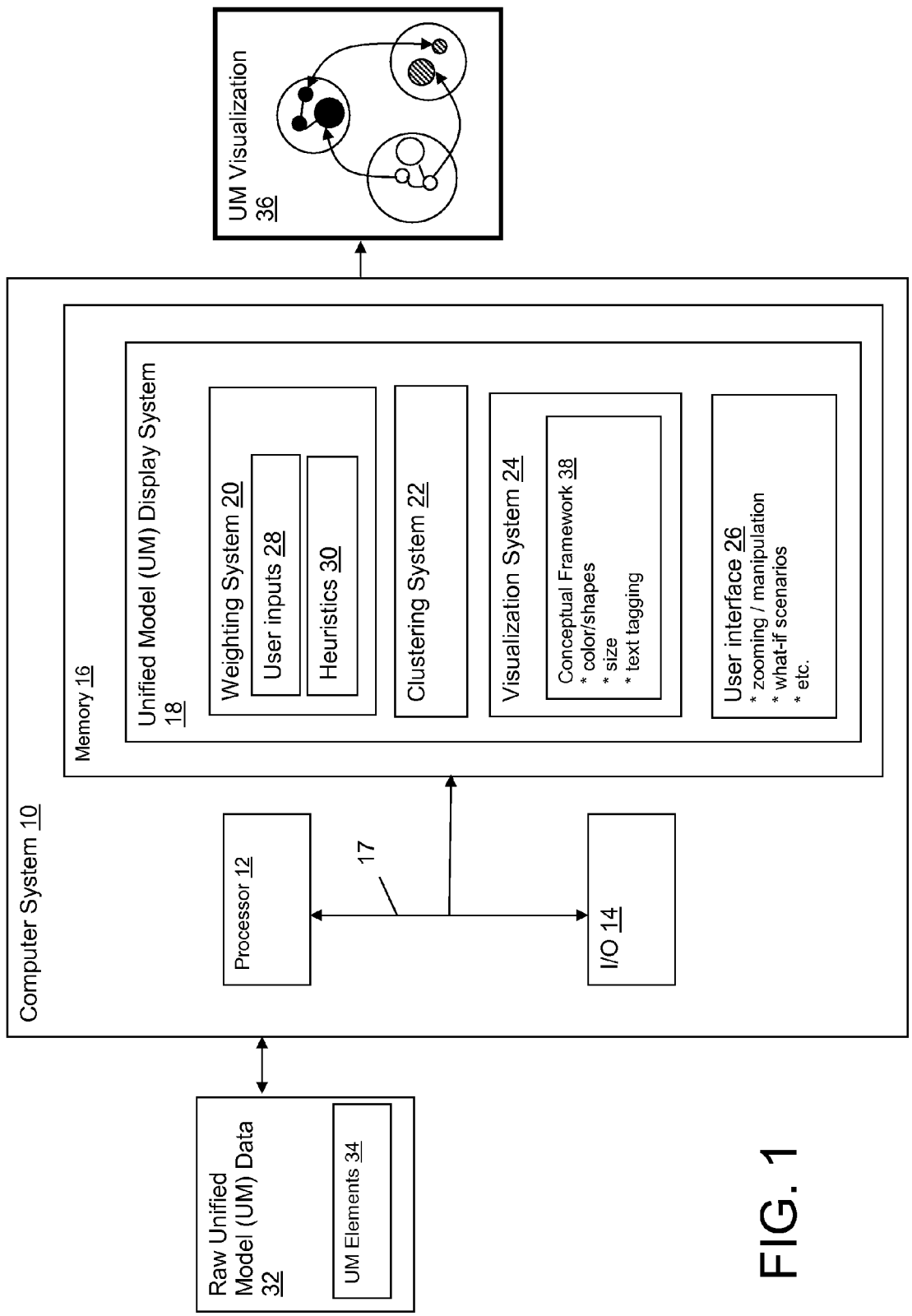
FIG. 1 depicts a computer system having a unified model visualization system in accordance with an embodiment of the present invention.

FIG. 1 depicts a computer system 10 having a unified model (UM) display system for processing raw UM data 32 and generating a UM visualization 36. UM visualization 36 provides a view of the raw UM data 32 that allows for an enhanced understanding of the information contained in the model. Raw UM data 32 may comprise any type of UM data created in accordance with any UM system, such as UML data, etc. UM display system 18 could be implemented as a stand-alone tool, or be integrated into a UM system, such as RUP, RSM, etc.

In order to generate UM visualization 36, UM display system 18 includes: a weighting system 20 that allows weights to be assigned to UM elements 34 and clusters; a clustering system 22 for clustering UM elements 34 and other clusters; a visualization system 24 for generated the UM visualization 36 within a high level conceptual framework 38; and a user interface 26.

As noted, weighting system 20 allows weights to be applied to UM elements 34. In an illustrative business process model, UM elements 34 may comprise roles, goals, activities, objects, and scenarios. For example, in the case where a web experience is being modeled, roles may define the type of user (e.g., customer, developer, etc.), goals may define what the user is hoping to achieve (e.g., learn about products/services offered, find a contact, etc.), activities may define actions users may take (e.g., purchase, download, etc.), objects may define things available from the website (e.g., whitepapers, manuals, etc.) and scenarios may track the manner in which the user interacts with the website.

Depending on the particular business goals of the company, certain UM elements may be deemed more important than others. For instance, being able to provide quick technical support for developers may be deemed more important than providing downloadable industry articles. Thus, UM elements 34 involving relating to support services may be weighted higher than UM elements 34 relating to providing articles of interest. In one illustrative embodiment, a scale of 100 may be utilized, with "100" being highly important and "1" being of low importance.

Weights may be assigned as user inputs 28, e.g., via user interface 26, or automatically via some type of heuristics. For example, in the case of the website, user activity can be tracked over time to identify important and unimportant UM elements 34 in the model. Any technique or system could be utilized, e.g., statistical, algorithmic, intelligent agents, etc. In addition to assigning weights to UM elements 34, weights can also be assigned to clusters generated by clustering system 22.

Clustering system 22 dynamically clusters UM elements 34 into meaningful categories or families. For instance, in the website example, UM elements 34 may be clustered as falling into a development category, a support category, a learning category, a purchase category, a relationships category and an undiscovered category. Clusters may also be applied to UM element types, e.g., all goals may be clustered. Moreover, clusters may be nested, for example a support cluster may contain sub-clusters such as activities, objects, etc. Obviously, the types and number of clusters will depend on the particular application being modeled. Cluster types may be determined in any manner, e.g., predetermined based on the type of application, selected by the user via the user interface 26, determined heuristically, etc.

Figure 2:
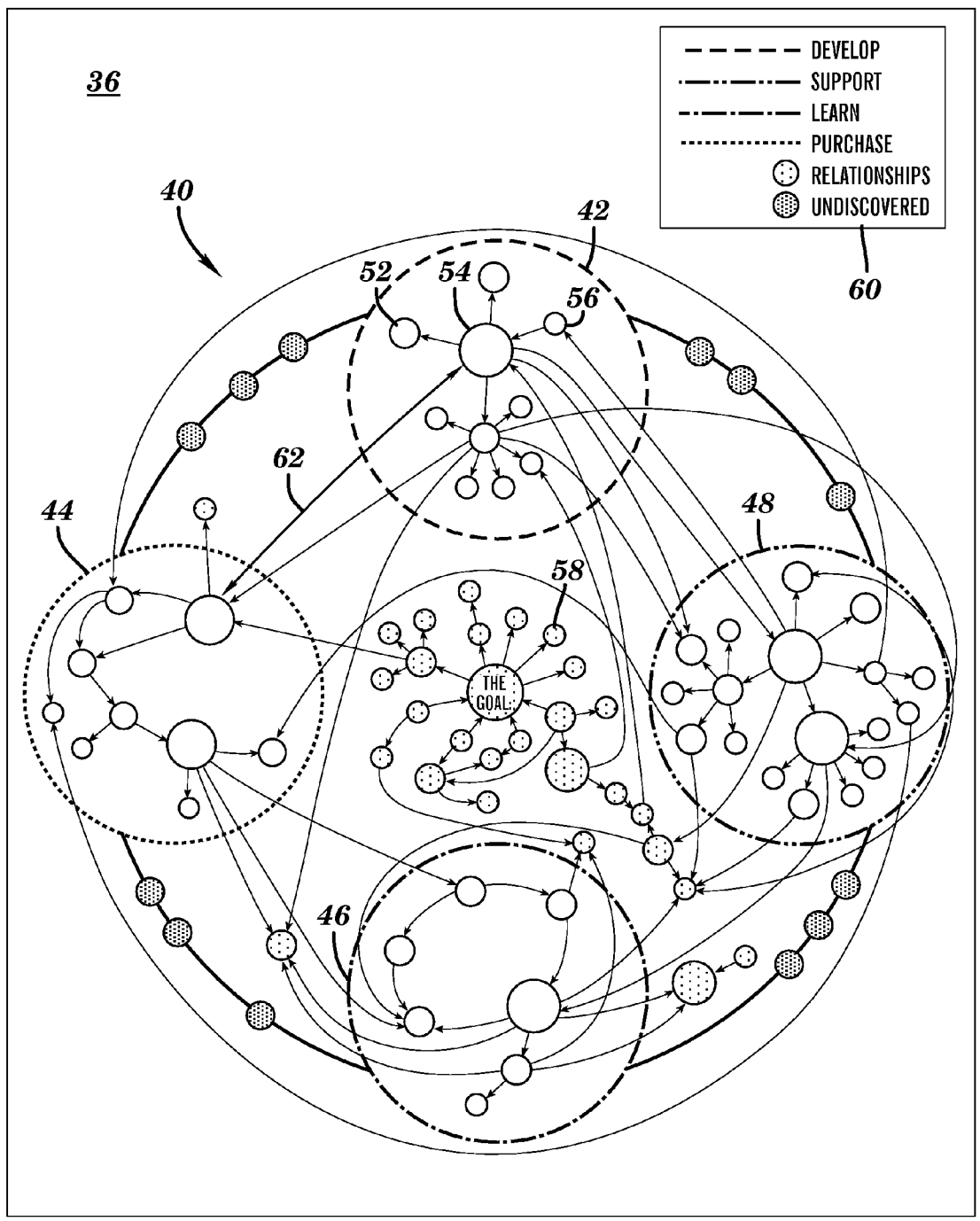
FIG. 2 depicts a unified model visualization generated in accordance with an embodiment of the present invention.
Figure 3:
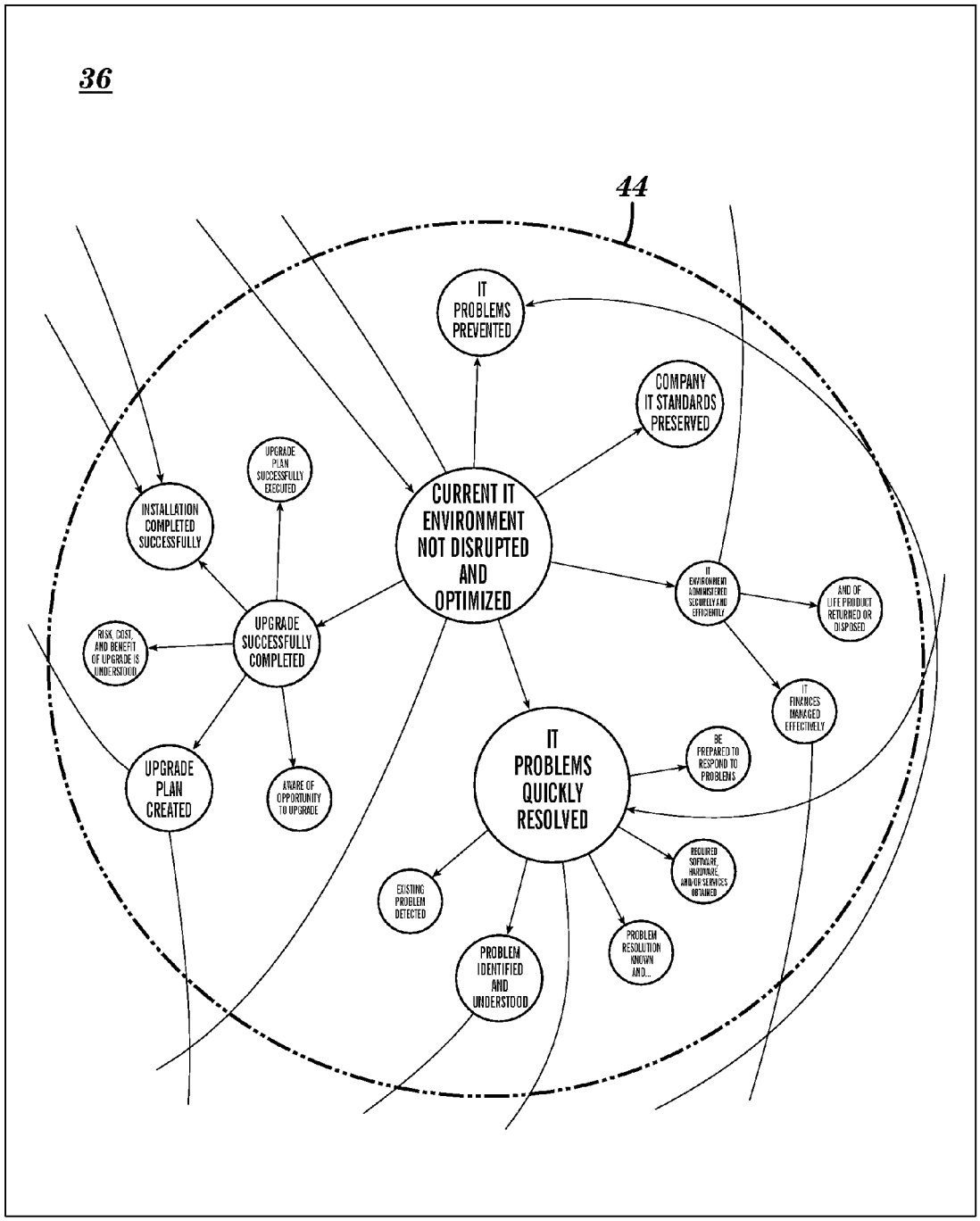
FIG. 3 depicts a zoomed in portion of the unified model visualization of FIG. 2 generated in accordance with an embodiment of the present invention.
Figure 4:
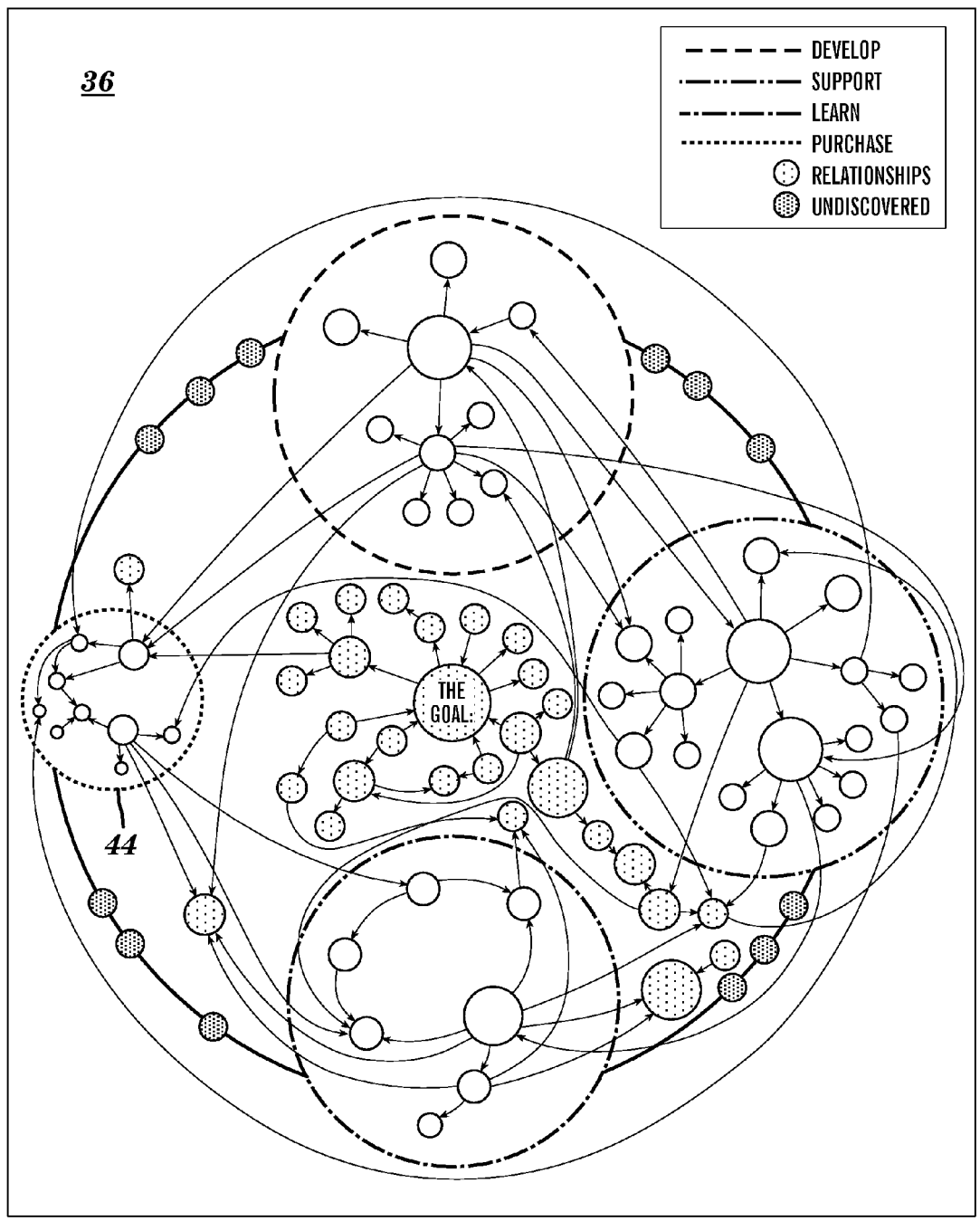
FIG. 4 depicts an altered version of the unified model visualization of FIG. 2 generated in accordance with an embodiment of the present invention.

Visualization system 24 dynamically creates the UM visualization 36 by utilizing a conceptual framework 38 into which the cluster and weighted element information is inserted. The conceptual framework 38 determines to visual format, e.g., the overall presentation, colors, shapes, sizes, locations, etc., of the elements and clusters. FIGS. 2-4, described below, depict illustrative embodiments of a UM visualization 36 in which a conceptual framework 38 of four large colored circles is used to define four associated clusters. It is understood that the particular presentation provided by the conceptual framework 38 is not limited to a particular format. Instead, different formats could be created and implemented for particular applications.

User interface 26 may comprise any type of interface, e.g., a graphical user interface, an existing UM system interface, etc., for interacting with the UM display system 18. Illustrative features may include the ability to zoom into and out of clusters and elements within the UM visualization 36; the ability to select/change the conceptual framework 38 to alter the format of the UM visualization; the ability to interact with the raw UM data; the ability to change weights and clustering definitions; the ability to submit "what-if" scenarios; the ability to manipulate the UM visualization 36 in 2D or 3D; the ability to output UM visualization 36 as an animated video; the ability to allow multiple users to interact simultaneously in a collaborative manner, etc.

Referring now to FIG. 2, an illustrative UM visualization 36 that utilizes a conceptual framework 40 having four primary clusters 42, 44, 46, and 48, representing "develop", "purchase" "support", and "learn" categories. Each cluster 42, 44, 46 and 48 is conceptualized in a colored circle that matches a legend 60. Within each of circles are elements (or sub-clusters) that belong to the cluster. Each such element shares the same color and is represented by a smaller circle. The size of the element circle is proportional to a weight assigned to the element. For example, within cluster 42, the highest weighted element 54 is represented by the large circle, while element 52, which is of a lower weight, is represented by a medium circle, and element 56, which is of even a lower weight, is represented by a small circle.

Note that in this particular framework 40, certain elements, e.g., element 58, fall outside the primary clusters 42, 44, 46, 48. In this case, those elements represent "relationships" which are color coded separately. Although not shown in detail, flow lines and arrows 62 are included to connect the elements within and among clusters to depict process flows.

FIG. 3 depicts UM visualization 36 in which cluster 44 has been zoomed to provide more details for the user. As noted above with regard to FIG. 1, a user interface 26 may be provided to allow the user to manipulate the UM visualization 36. Any type of graphical or data manipulation may be provided to enhance the user experience.

FIG. 4 depicts a slightly revised UM visualization 36 in which cluster 44 has been assigned a lower weight, which results in a smaller circle for that cluster. As noted above, clusters, as well elements, can be assigned a weight.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a UM display system 18 could be created, maintained and/or deployed by a service provider that offers the functions described herein for customers. That is, a service provider could offer to deploy or provide the ability to generate UM visualizations 36 as described above.

It is understood that in addition to being implemented as a system and method, the features may be provided as a program product stored on a computer-readable medium, which when executed, enables computer system 10 to provide a UM display system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for displaying unified model (UM) data in a UM visualization, comprising:
    a weighting system for assigning weights to UM elements;
    a clustering system for clustering the weighted UM elements into clusters, the weighting system further assigning weights to the clusters; and
    a visualization system for displaying the weighted clusters and the weighted UM elements in the weighted clusters within a conceptual framework;
    wherein a size of each weighted UM element displayed within the conceptual framework is proportional to the weight assigned to the weighted UM element, and wherein a size of each weighted cluster displayed within the conceptual framework is proportional to the weight assigned to the weighted cluster.

2. The system of claim 1, wherein the weighting system determines weights manually based on user input.

3. The system of claim 1, wherein the weighting system determines weights automatically based on a heuristic.

4. The system of claim 1, wherein the conceptual framework determines colors, shapes and sizes of the UM elements being displayed.

5. The system of claim 1, further comprising a user interface for allowing a user to manipulate the UM visualization.

6. A program product stored on a non-transitory computer readable medium, which when executed by a computer system, displays unified model (UM) data in a UM visualization, and comprises program code configured for:
    assigning weights to UM elements;
    clustering the weighted UM elements into clusters and assigning weights to the clusters; and outputting and displaying the weighted clusters and the weighted UM elements in the weighted clusters within a conceptual framework;

wherein a size of each weighted UM element displayed within the conceptual framework is proportional to the weight assigned to the weighted UM element, and wherein a size of each weighted cluster displayed within the conceptual framework is proportional to the weight assigned to the weighted cluster.

7. The program product of claim 6, wherein weights are assigned manually based on user input.

8. The program product of claim 6, wherein weights are assigned automatically based on a heuristic.

9. The program product of claim 6, wherein the conceptual framework determines colors, shapes and sizes of the UM elements being displayed.

10. The program product of claim 6, further comprising program code configured for providing a user interface for allowing a user to manipulate the UM visualization.

11. A method for displaying unified model (UM) data in a UM visualization, comprising:

assigning weights to UM elements;

clustering the weighted UM elements into clusters and assigning weights to the clusters;

displaying the weighted clusters and the weighted UM elements in the weighted clusters within a conceptual framework; and outputting the UM visualization containing the conceptual framework;

wherein a size of each weighted UM element displayed within the conceptual framework is proportional to the weight assigned to the weighted UM element, and wherein a size of each weighted cluster displayed within the conceptual framework is proportional to the weight assigned to the weighted cluster.

12. The method of claim 11, wherein weights are manually assigned based on user input.

13. The method of claim 11, wherein weights are weights are automatically assigned based on a heuristic.

14. The method of claim 11, wherein the conceptual framework determines colors, shapes and sizes of the UM elements being displayed.

15. The method of claim 11, further comprising manipulating the UM visualization via a user interface.

16. A method for deploying a system for displaying unified model (UM) data in a UM visualization, comprising:

providing a computer infrastructure being operable to:
assign weights to UM elements;
cluster the weighted UM elements into clusters and assigning
weights to the clusters;
display the weighted clusters and the weighted UM elements in the weighted clusters within a conceptual framework; and
output the UM visualization containing the conceptual framework;
wherein a size of each weighted UM element displayed within the conceptual framework is proportional to the weight assigned to the weighted UM element, and wherein a size of each weighted cluster displayed within the conceptual framework is proportional to the weight assigned to the weighted cluster.

* * * * *